United States Patent
Hageman et al.

(10) Patent No.: US 11,483,728 B1
(45) Date of Patent: Oct. 25, 2022

(54) SYSTEM AND METHOD FOR MULTI-MODE GRAPHIC VISUALIZATION OF WIRELESS LINK PARAMETERS

(71) Applicant: Rockwell Collins, Inc., Cedar Rapids, IA (US)

(72) Inventors: Michael L. Hageman, Mt. Vernon, IA (US); Ronald Zozaya, Fairfax, IA (US); Paul S. Corwin, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/140,946

(22) Filed: Jan. 4, 2021

(51) Int. Cl.
*H04W 24/10* (2009.01)
*G06F 3/04847* (2022.01)
*H04L 41/22* (2022.01)

(52) U.S. Cl.
CPC ........ *H04W 24/10* (2013.01); *G06F 3/04847* (2013.01); *H04L 41/22* (2013.01)

(58) Field of Classification Search
CPC ..... H04W 24/10; G06F 3/04847; H04L 41/22
See application file for complete search history.

(56) References Cited

U.S. PATENT DOCUMENTS

| | | | |
|---|---|---|---|
| 5,761,429 A | 6/1998 | Thompson | |
| 8,948,022 B2 | 2/2015 | Caudill et al. | |
| 9,269,239 B1 * | 2/2016 | Jensen | G06V 20/20 |
| 9,935,852 B2 | 4/2018 | Nasgowitz et al. | |
| 10,080,107 B2 | 9/2018 | Kats et al. | |
| 2008/0123586 A1 * | 5/2008 | Manser | H04L 63/30 370/328 |
| 2013/0100154 A1 * | 4/2013 | Woodings | G06T 11/001 345/589 |
| 2014/0280921 A1 | 9/2014 | VanderKoy et al. | |
| 2018/0083723 A1 * | 3/2018 | Musters | G06T 11/206 |
| 2018/0302307 A1 | 10/2018 | Wu et al. | |
| 2019/0007127 A1 | 1/2019 | Ward | |

FOREIGN PATENT DOCUMENTS

CN 104994514 B 6/2019

* cited by examiner

*Primary Examiner* — John T Repsher, III
(74) *Attorney, Agent, or Firm* — Suiter Swantz pc llo

(57) ABSTRACT

A system and method for multimode graphic visualization of wireless link parameters is disclosed. In embodiments, the system receives sensed or simulated network performance data relevant to wireless link connections (e.g., communications, navigation, ranging) between network nodes or platforms. The system derives from the network performance data link performance parameters for each wireless link between a first platform or node and other platforms of the network, e.g., bandwidths, waveform types, success/failure indicators, link non-reception or jamming statuses, low probability of intercept (LPI) signal detection/interception statuses, and negative link margins. The system generates graphic visualizations of the network nodes, the wireless links therebetween, and selected performance parameters for each link in one or more selectable performance modes for presentation to a user/operator via a display system; the user/operator may control the presentation mode or displayed elements via control input.

12 Claims, 11 Drawing Sheets

SYSTEM AND METHOD FOR MULTI-MODE GRAPHIC VISUALIZATION OF WIRELESS LINK PARAMETERS

BACKGROUND

In simulated network environments (including contested environments) incorporating multiple mobile platforms and/or stations, visualizing key wireless parameters is critical to communicating system capabilities to potential customers. Similarly, visualization in the context of testing and evaluation by engineering and development staff helps to highlight system deficiencies yet to be addressed. Whether in simulated or real-world environments, visualizing wireless links and their critical performance parameters via intuitive displays benefits mission planners responsible for laying out communication networks in contested environments and pilots depending on said wireless networks to fulfill mission objectives. However, the present state of the art is limited both with respect to the amount of information conveyable and to the clarity of the conveyed information (e.g., binary connectivity status; frequencies used and the direction of signal travel; "squawks" and like transmission events; and terrain blockage, e.g., when a wireless link ends or is obscured by the earth's surface).

SUMMARY

A system for multimode visualization of wireless link parameters is disclosed. In embodiments, the system may be associated with a network node of a wireless or simulated wireless network (including, e.g., communications, navigation, ranging, and/or other appropriate types of wireless links). For example, the system may receive sensed and/or simulated performance data for any wireless links between the node and other nodes throughout the network. The system may derive from the received performance data performance parameters specific to each wireless link. The system includes a graphics generator for creating and displaying (e.g., via platform-based, station-based simulated display systems) graphical visualizations of the node (e.g., or of the network, in whole or in part), wireless links between the node and other network nodes, and performance parameters specific to each link.

In some embodiments, the wireless links include non-received links (e.g., wireless links of which an intended recipient does not have reception due to jamming or some other form of interference), and the displayed parameters include a non-reception status of the non-received link, e.g., a reception threshold point (RTP) based on one or more applicable reception metrics, e.g., a required signal-to-interference (S/I) ratio, compared to actual interference levels, the RTP indicating a location where the node would need to be to have reception of the signal.

In some embodiments, the non-received link is a jammed link, and the non-reception status is a jamming status indicating whether the jamming source or platform is hostile (e.g., adversarial) or friendly.

In some embodiments, the wireless links include links received by another platform or node within the network (whether by intended, friendly, or adversarial recipients), and the link parameters include a low probability of interception (LPI; e.g., low probability of detection (LPD)) status. For example, the LPI status may include whether the detecting platform is hostile or friendly, and an excess reception power indicator (ERPI) indicating excess receiving power over a minimum reception threshold at the receiving platform.

In some embodiments, the graphic visualization includes a spectrum analysis display including, e.g., frequency bandwidths and/or power levels (e.g., peak, average) of wireless links associated with a node or nodes.

In some embodiments, the graphic visualization includes interactive text displays for each wireless link, e.g., including in textual form link parameters not otherwise graphically represented or selected for textual display.

In some embodiments, the graphics generator presents graphical visualizations in multiple presentation modes, e.g., link connectivity (LC) mode, electromagnetic (EM) spatial mode, platform focused (PF) mode. The system includes input devices allowing the user to toggle between different presentation modes as needed or desired.

In some embodiments, the presented link parameters include: bandwidth; waveform type; reception status of a transmitted or received packet (e.g., complete transmission or reception, partial transmission or reception, or failed transmission/non-reception); jamming status, LPI/detection status; and/or link margin.

A method for multimode visualization of wireless link parameters is also disclosed. In embodiments, the method includes receiving network performance data for wireless links (including, but not limited to, communications, navigation, and/or ranging links) between nodes of a wireless network environment. The method includes deriving, based on the received performance data, link parameters specific to each wireless link. The method includes generating graphical visualizations representative of the network nodes (e.g., a node and all nodes linked thereto, the network in whole or in part), the wireless links, and the derived link parameters. The method includes presenting the generated graphical visualizations to users via display devices, e.g., platform- or station-based devices or simulator displays.

In some embodiments, the method includes deriving link parameters selected from a group including: success or failure of a transmitted or received packet (e.g., complete transmission/reception, partial transmission/reception, or failed transmission/non-reception); jamming status (e.g., for links not received due to jamming interference), LPI/detection status; and/or link margin.

In some embodiments, the wireless links include non-received links (e.g., jammed or otherwise non-received due to interference), and the method includes deriving an RTP based on one or more applicable reception metrics compared to actual interference levels, the RTP indicating a location where a node would need to be to have reception of the signal.

In some embodiments, the wireless links include detected links associated with a receiving platform (e.g., a platform detecting, identifying, processing, or decoding a wireless signal sent via the wireless link), and the method includes deriving a low probability of interception (LPI; e.g., low probability of detection (LPD)) status. For example, the LPI status may include whether the receiving platform is hostile or friendly and/or an ERPI dB distance based on excess power levels over a minimum reception power threshold at the detecting platform.

In some embodiments, the method includes generating a spectrum analysis display, e.g., representative of a particular network node and its associated wireless links.

In some embodiments, the method includes generating an interactive text display for each wireless link, the interactive text display presenting textually selected link parameters or link parameters not otherwise graphically presented.

In some embodiments, the method includes presenting graphical visualizations in multiple presentation modes, e.g., a link-connectivity mode and/or a platform-focused mode, and, based on control input provided by a user, selecting from among multiple graphical visualizations or associated modes to be displayed.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
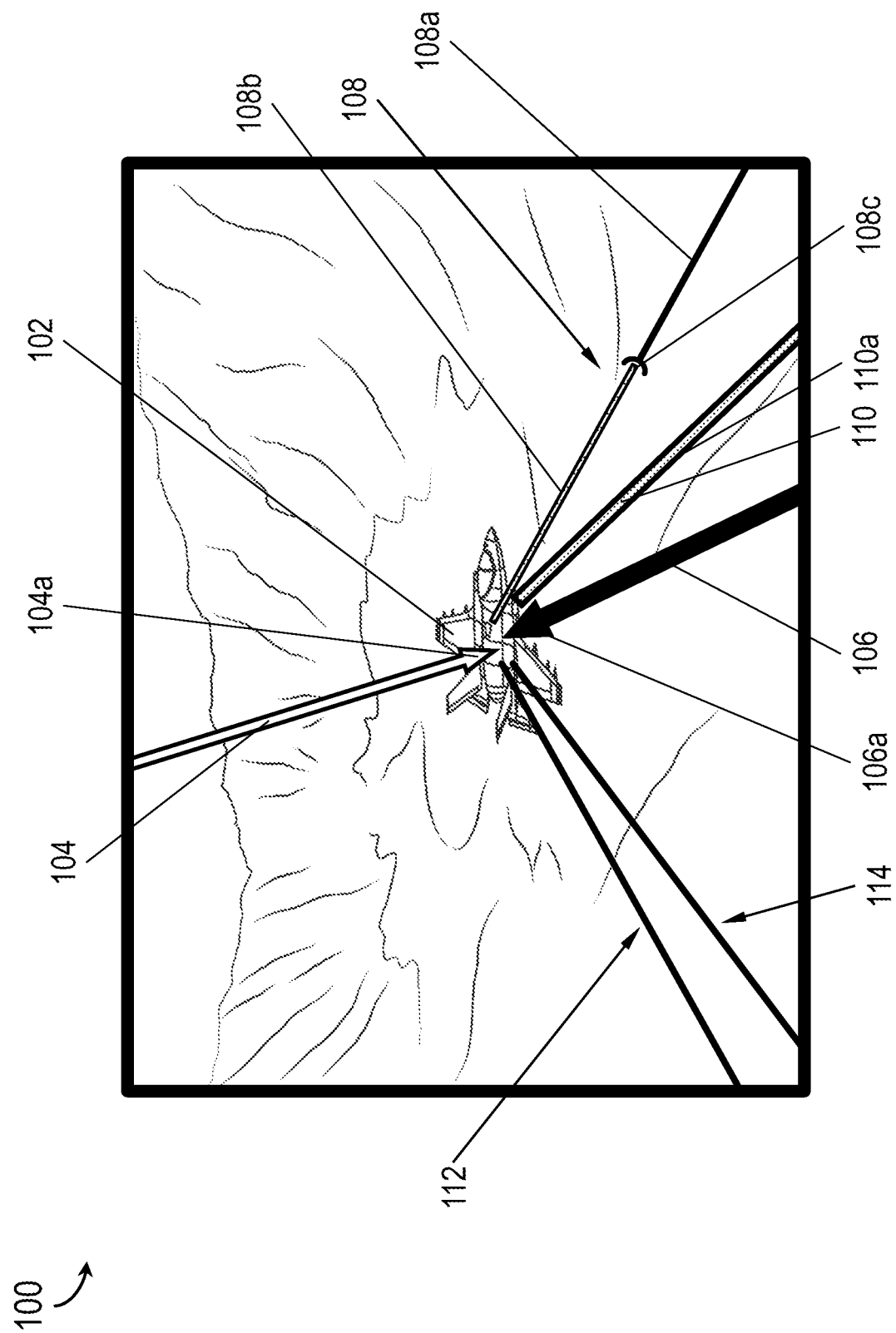
FIG. 1 is an illustration of a graphic visualization (produced by the system of FIG. 2) according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring now to FIG. 1, a graphic visualization 100 in a line connectivity (LC) presentation mode is disclosed.

In embodiments, the graphic visualization 100 may be displayed to a pilot, operator, or other user via a display system (e.g., a cockpit-mounted display system or display system associated with a ground-based vehicle or station and capable of presenting one or more of Synthetic Vision Systems (SVS), Enhanced Vision Systems (EVS), and Combined Vision Systems (CVS) content) or simulation of such a display system. In some embodiments, the graphic visualization 100 may be displayed by non-vehicle-based display systems, e.g., command and control (C2) stations; test range systems and other monitoring platforms, design and analysis systems (e.g., model and/or simulator-based systems), to designers, engineers, analysts, planners, and other personnel associated with said display systems. The graphic visualization 100 enhances the LC mode of conventional visualization schemes via novel parameters and visualization techniques and adds additional presentation modes for conveying link performance parameters in optimally clear and non-cluttering ways, e.g., a platform-focused (PF) mode disclosed in greater detail below.

In embodiments, the graphic visualization 100 may be based on link status and performance information collected by, and/or relevant to, a platform 102 (e.g., an aircraft, ground-based vehicle, water-based vehicle or other mobile platform; a ground control station of fixed location; a network node, generally) of a wireless communication network. For example, the platform 102 may establish and/or maintain wireless links 104, 106, 108, 110 to other nodes of the network (e.g., other mobile platforms or ground stations). Onboard sensors of the platform 102 (or, e.g., the simulator executing a simulated network of nodes (for example, a complete and accurate knowledge base of wireless links and jammers throughout a simulated environment, or a platform-specific or otherwise limited subset of the knowledge base)) may monitor the performance of each wireless link 104, 106, 108, 110 and thereby determine performance parameters of each communication link, e.g., via sensing and/or derivation.

In embodiments, the graphic visualization 100 may include the platform 102 and any other platforms or network nodes to which the platform is connected via wireless links 104-110. For example, the graphic visualization 100 may be zoomed in or out by the operator, e.g., to increase or decrease the scope or detail visible at any time.

In embodiments, wireless links 104-110 may include, but are not limited to, any appropriate wireless communication link. For example, wireless links 104-110 may include other wireless link types, e.g., navigational, telemetry, radar or other ranging links. Further, wireless links 104-110 may include, but are not limited to, radio frequency (RF) or any appropriate electromagnetic (EM) waves; acoustic or analog signals; photonic or optical signals; or any other appropriate wireless signaling means or method. In embodiments, "receiving" a wireless signal via wireless links 104-110 may include, but is not limited to, the act of processing a wireless signal or the ability to do so. For example, a wireless signal may be detected, e.g., by determining that it has been transmitted; the wireless signal may be identified, e.g., by identifying the type of signal transmitted. Similarly, the direction of arrival of a wireless signal may include the direction from which it was transmitted. In embodiments, reception of a wireless signal may be associated with the transfer of information (e.g., digital or analog, still or video images, text, etc.) according to one or more reception metrics, e.g., error rate (bit error rate (BER), symbol error rate, packet error rate); absolute power level; signal-to-noise ratio (SNR; including normalized SNR or "SNR per bit" (Eb/N0)) applicable to define a boundary between reception and non-reception of the wireless signal.

In embodiments, the graphic visualization 100 may selectably convey one or more novel link performance parameters relevant to the wireless links 104, 106, 108, 110, e.g.: a waveform type; a data throughput rate; a system or medium latency or delay; a hop count; the success or failure of a transmitted or received packet; a direction of an inbound signal or message; a jamming power of a jammed transmission or reception; a radio frequency (RF) spectrum display of signal frequencies, bandwidths, and power levels (e.g., peak power, average power, and any other appropriate power measurement); and a low probability of intercept (LPI, e.g., low probability of detection (LPD), low probability of geolocation (LPG)) signal status, or the potential of a signal or transmission for detection by a hostile (or friendly) party.

For example, the wireless link 104 may represent a successful satellite-based communication (satcom) transmission to the platform 102, while the wireless link 106 may represent a successful ground-based transmission to the platform 102; the successful reception of each transmission may be indicated by terminal arrows 104a, 106a while the two wireless links may be distinguished by, e.g., marking or shading (e.g., the wireless link 104 may be rendered in yellow while the wireless link 106 may be rendered in blue) or different textures (e.g., outlining, fill patterns, etc. if the graphic visualization 100 is presented via a monochrome or grayscale display; straight, broken, or curved lines). With respect to the wireless links 104, 106 (as well as any other wireless links visualized), the graphic visualization 100 may additionally convey signal strength, e.g., via relative line thickness (the thicker the line, the stronger the signal).

In embodiments, the graphic visualization 100 may convey additional link performance parameter information with respect to attempted or successful jammed wireless links and the associated jamming sources. For example, the platform 102 may attempt, but may not have, reception of the wireless link 108, e.g., due to jamming by an external source proximate to the platform. The non-received wireless link 108 (e.g., jammed wireless link) may be represented by a first portion 108a in a first color or texture (e.g., orange) and a second portion 108b representing jamming at the receive platform 102. For example, the second portion 108b may extend from the platform 102 to a reception threshold position 108c (RTP), e.g., a point based on a distance from the transmitting source (not shown) where the platform 102 would have reception of the transmission (e.g., to a particular level of probability) in spite of the jamming source. For example, the RTP 108c may be based on the signal-to-interference (S/I) ratio required to jam the transmission at the (receiving) platform 102 and the actual sensed interference associated with the jamming source. In some embodiments, the graphic visualization 100 may account for additional jamming sources. For example, the graphic visualization 100 may include, e.g., a wideband noise jammer 112 and dual-tone (e.g., paired) jammers 114, strong at the platform 102 but out-of-band of any of the incoming wireless signals associated with the wireless links 104-110.

In embodiments, the graphic visualization 100 may convey additional link performance parameter information with respect to transmissions or receptions detected by other platforms (e.g., hostile or friendly platforms). For example, the wireless link 110 may represent an outbound transmission by the platform 102 received (e.g., detected, intercepted) by a hostile sensing platform (e.g., as indicated by the adversary reception indicator 110a (ARI) bordering or outlining the wireless link 110).

Figure 2:
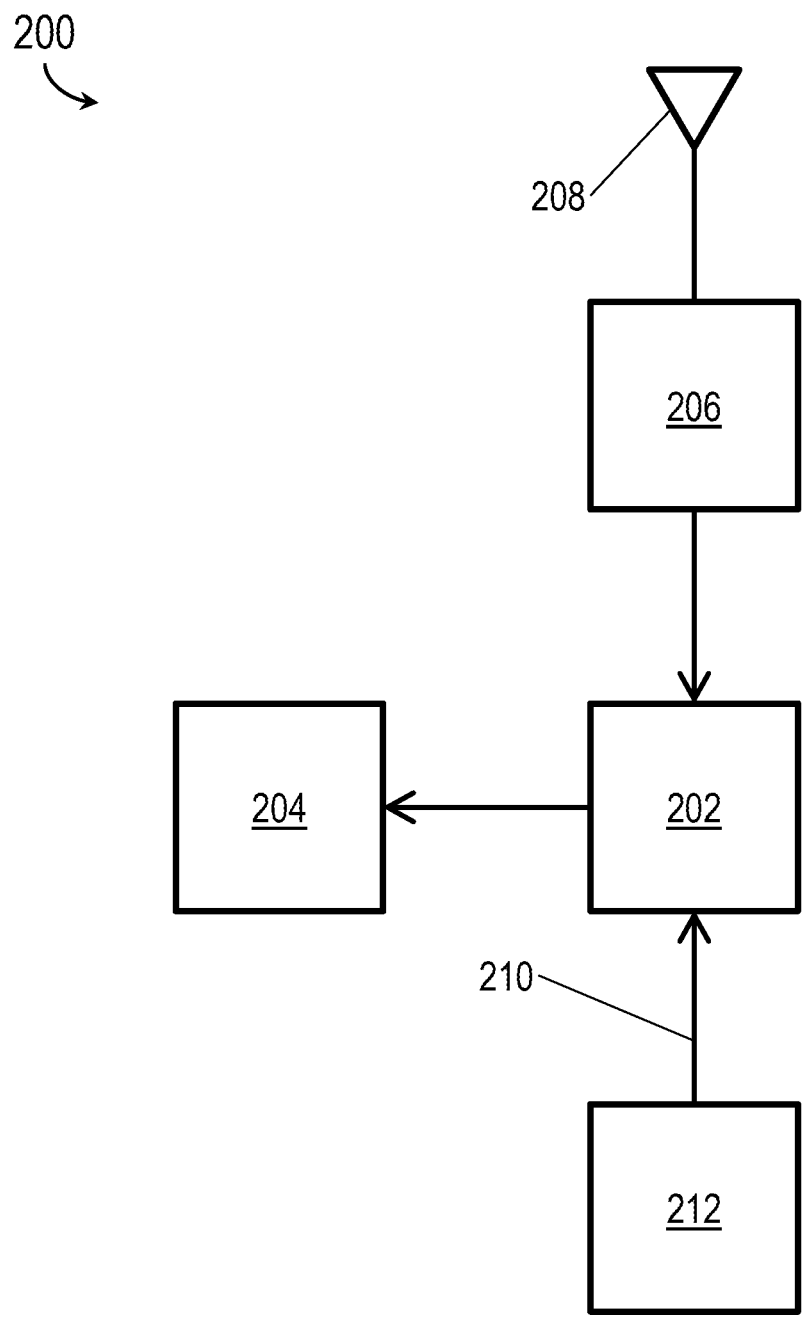
FIG. 2 is a block diagram of a system for multimode visualization according to example embodiments of this disclosure.

Referring now to FIG. 2, a system 200 for multimode visualization of wireless link performance parameters is disclosed.

In embodiments, the system 200 may include graphics generation (GG) processors 202 capable of generating and displaying graphic visualizations (100, FIG. 1) via a display system 204 (e.g., cockpit-mounted display system, vehicle-based display system, ground station-based display system, simulator display system). For example, the GG processors 202 may receive link performance data from a transceiver 206 configured for serving as a terminal point for one or more wireless links (104, 106, 108, 110; FIG. 1) and configured for "listening" or sensing link performance data (e.g., via antenna elements 208). In some embodiments, the GG processors 202 may receive simulated link parameter data associated with wireless links 104-110 in a simulated environment.

Figure 7A:
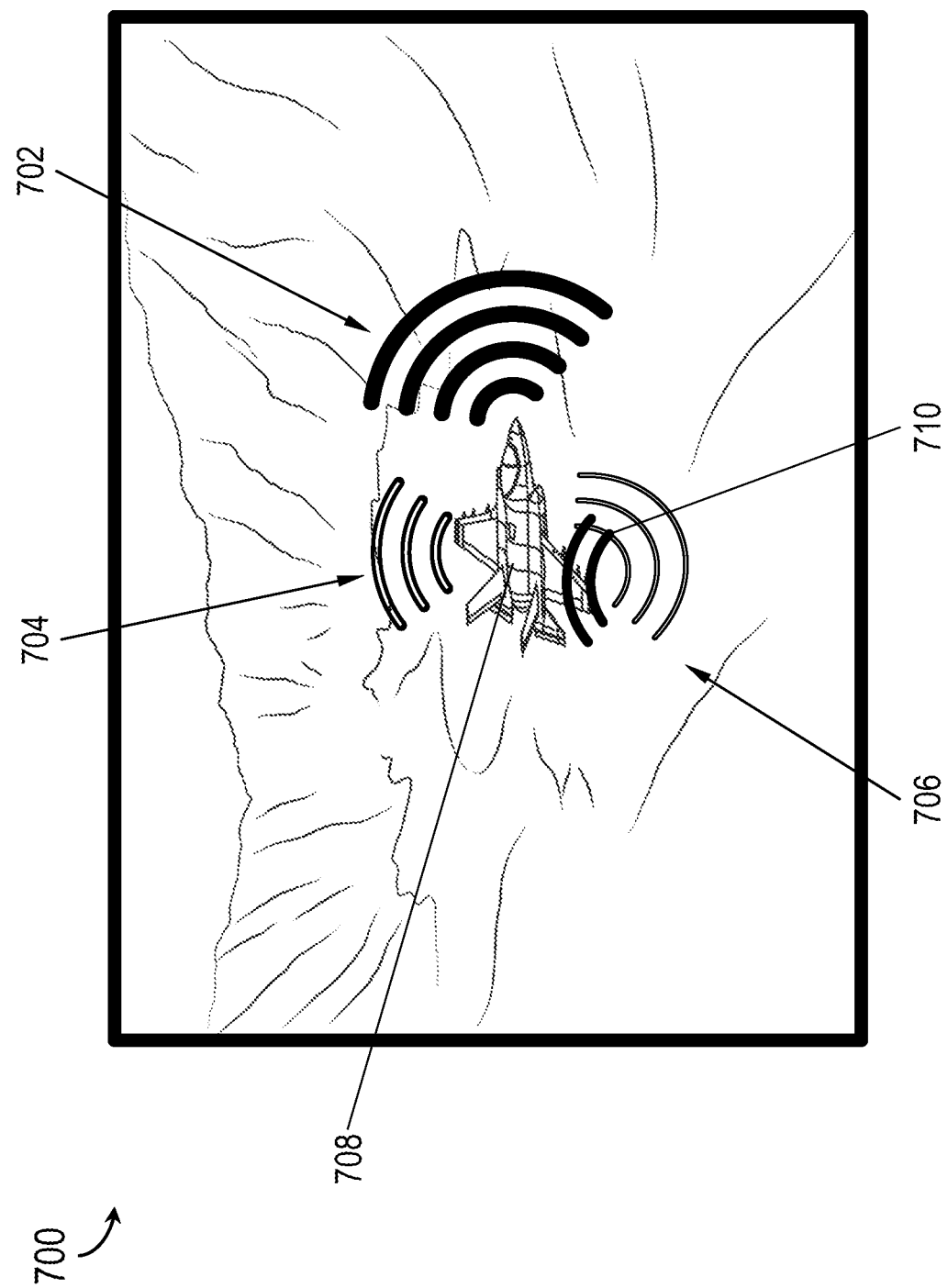
FIGS. 7A through 7D are illustrations of the graphic visualization of FIG. 1 in an alternative presentation mode.
Figure 7B:
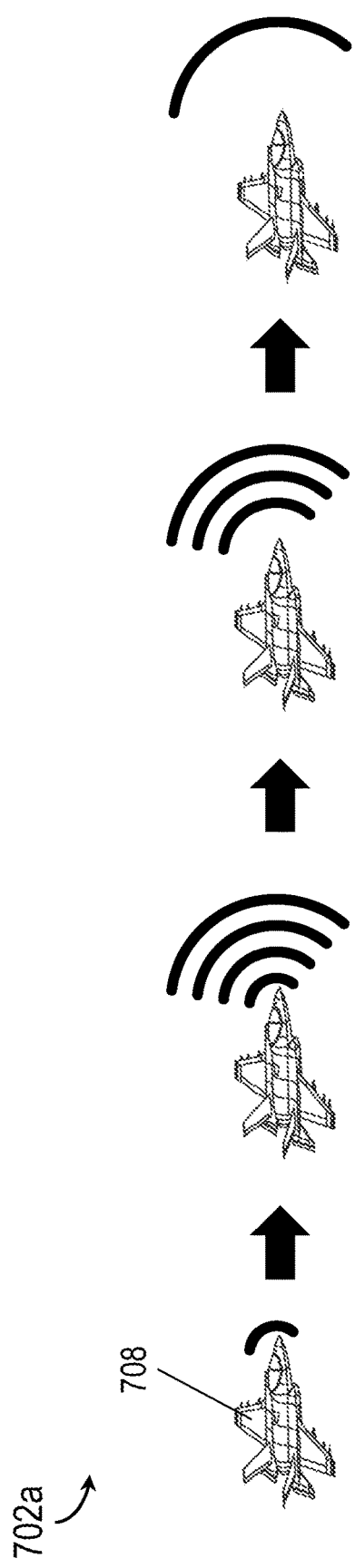

In embodiments, the GG processors 202 generate and present graphic visualizations 100 (e.g., via the display system 204) based on control input 210 received from a pilot or operator through one or more input devices 212 (e.g., a keypad configured for providing textual input, a control switch capable of manipulating a cursor through the graphical visualization and selecting (e.g., via "clicking") individual elements thereof). For example, the operator may, via the input devices 212, select parameters to be displayed graphically and other parameters for textual display (as described in greater detail below). In some embodiments, the operator may change the selected definition of "reception" (e.g., detecting, intercepting, decoding) for any platform to tailor the display of link information. Similarly, the operator may toggle the graphic visualization 100 between the LC mode (e.g., as shown by FIG. 1) and other presentation modes, e.g., a platform focused (PF) mode, e.g., as shown by FIGS. 7A-B below.

Figure 3:
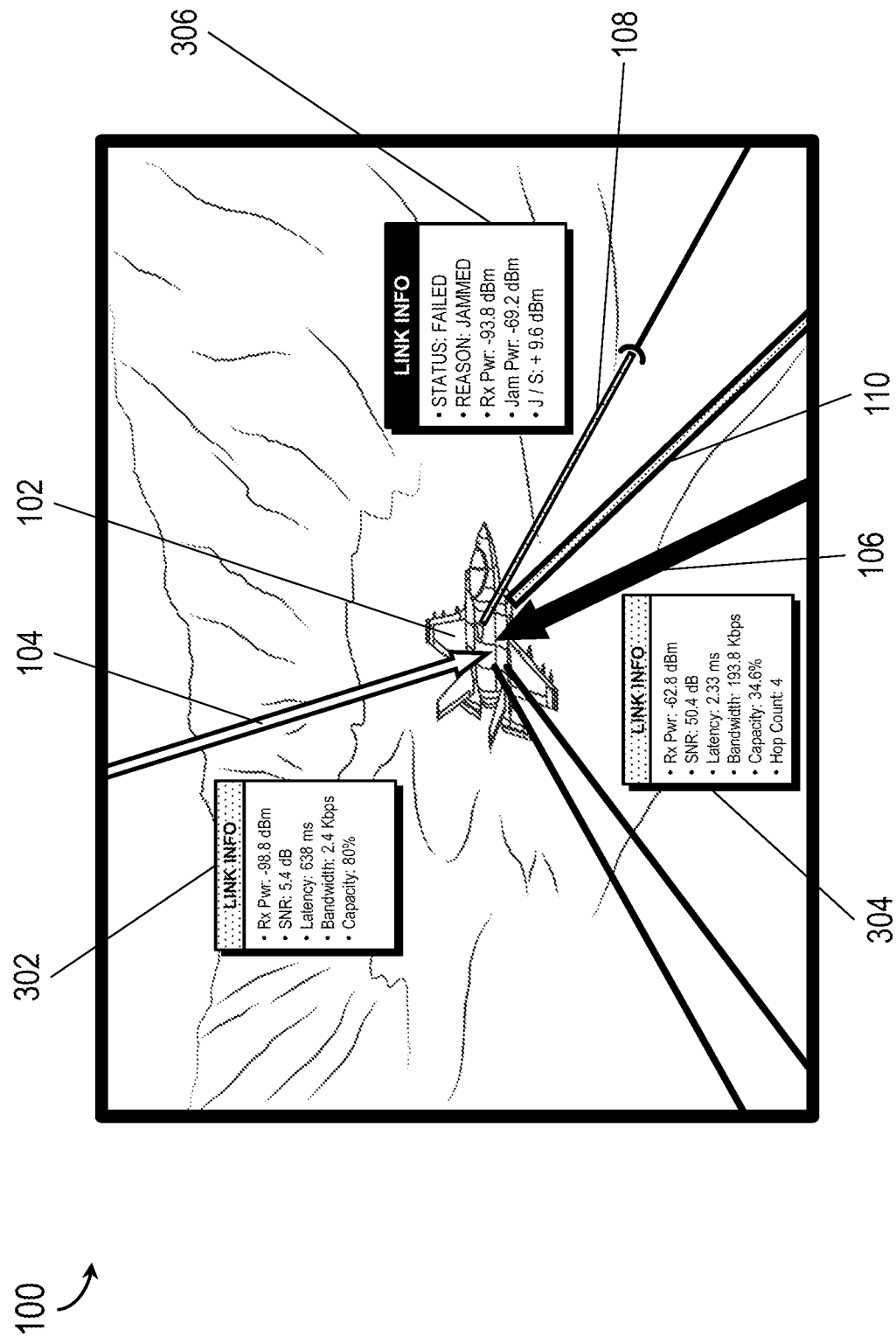
FIGS. 3 and 4 are illustrations of the graphic visualization of FIG. 1.

Referring now to FIG. 3, in embodiments, the graphic visualization 100 may provide additional user-configurable link parameter reports 302-306 for each of the wireless links 104-110. For example, the operator may (e.g., via input devices 212, FIG. 2) click on or hover over (e.g., via an interactive, steerable cursor) an individual wireless link (e.g., the successful satcom transmission 104) to display a link parameter report 302. The link parameter report 302 may provide, in textual format, additional parameters specific to the successful satcom transmission 104 not otherwise selected for graphical representation (e.g., receiver (Rx) power at the platform 102; signal-to-noise ratio (SNR); latency/delay; bandwidth; capacity; hop count). Each of the link parameter reports 302-306 may be configured by the operator (e.g., in conjunction with the corresponding wireless links 104-110) to select which link parameters are displayed graphically and which link parameters are displayed textually via the link parameter reports.

Similarly, in embodiments the link parameter reports 304, 306 may respectively provide in textual format additional link parameter data specific to the successful ground-to-platform transmission 106 and the jammed attempted transmission 108. For example, the link parameter report 306 may include textual link parameter data specific to a non-received wireless link (108), e.g., whether the transmission/reception succeeded or failed; the reason for a failed transmission/reception (e.g., JAMMED, TERRAIN, BLOS); jamming signal power and jamming-to-signal (J/S) ratio at the platform 102. In some embodiments (e.g., full color displays), the link parameter reports 304, 306 may additionally indicate link success or failure via color elements. For example, the link parameter report 304 corresponding to the successful ground-to-platform transmission 106 may be displayed in shades of green or blue while the link parameter report 306 corresponding to the non-received/jammed transmission 108 may displayed in shades of red. Additionally or alternatively (e.g., on monochrome displays), the link parameter reports 304, 306 may be displayed in different textures to indicate at a glance the success or failure of their corresponding wireless links 106, 108. In some embodiments, link parameter reports 304, 306 may present quantitative information corresponding to graphic link parameter elements capable of providing only qualitative information about a particular parameter. For example, the non-received/jammed link 108 may indicate relative J/S ratio at the platform 102; however, only the corresponding link parameter report 306 may be able to indicate the exact receiving and jamming power levels (e.g., in dBm).

Figure 4:
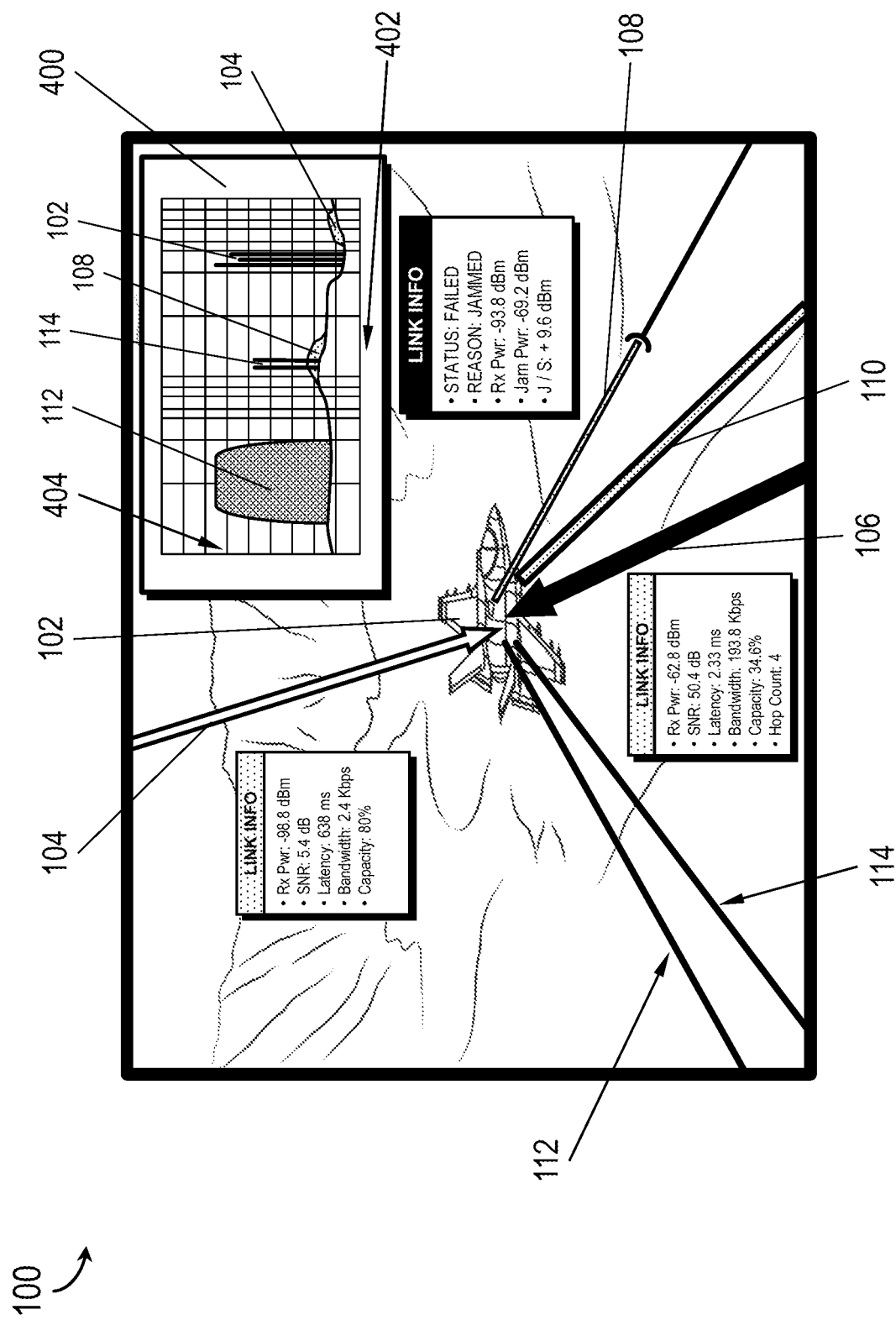

Referring now to FIG. 4, the graphic visualization 100 may include a selectable spectrum analysis display 400. For example, the spectrum analysis display 400 may be configured for automatic display or displayed within the graphic visualization 100 when selected or enabled by the operator. In embodiments, the spectrum analysis display 400 may summarize, across a frequency bandwidth (horizontal axis 402) assigned to or otherwise associated with the platform 102, signal power levels (vertical axis 404) associated with each of the wireless links 104-110 associated with the platform 102 (e.g., including the out-of-band jammers 112, 114).

Figure 5:
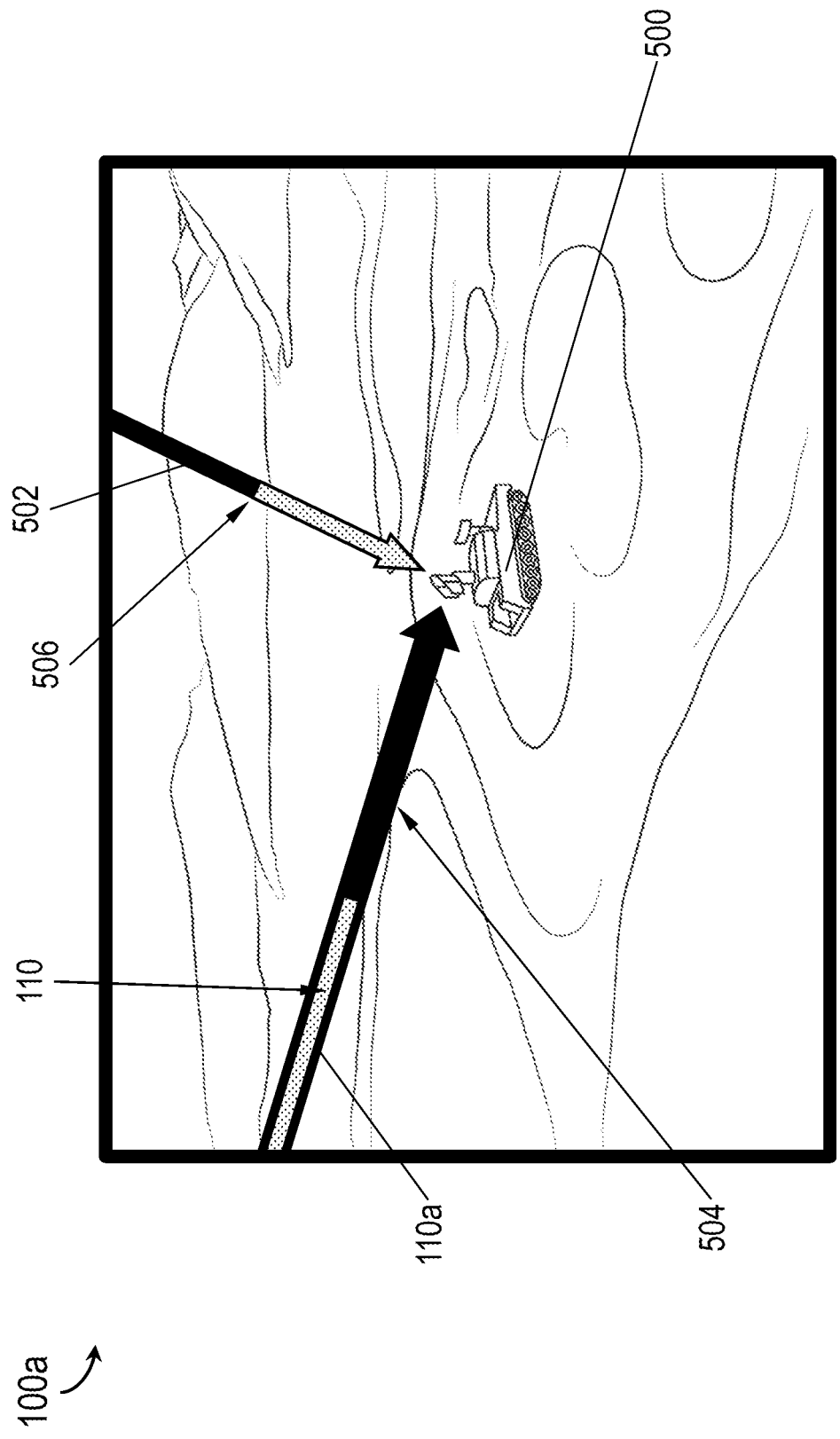
FIG. 5 is an illustration of a graphic visualization produced by the system of FIG. 2 according to example embodiments of this disclosure.

Referring to FIG. 5, the graphic visualization 100a may be implemented and may function similarly to the graphic visualization 100 of FIGS. 1 through 4, except that the graphic visualization 100a may focus on a sensor platform 500. For example, the sensor platform 500 may exist elsewhere within the contested, real-world, or simulated environment including the platform 102 of FIG. 1, such that the sensor platform 500 is associated with the reception (e.g., interception, detection, and/or decoding, as described above) of wireless links, e.g., the detected wireless link 110 originating at the platform 102. In embodiments an operator, observing from the graphic visualization 100 that the wireless link 110 has been received (e.g., intercepted, detected, decoded) by an adversary or hostile platform (e.g., via ARI 110a), may shift the perspective of the graphic visualization to the hostile platform, resulting in the graphic visualization 100a focused on the sensing platform 500 and including low probability of intercept (LPI) or low probability of detection (LPD) information.

In embodiments, the sensing platform 500 may be associated with a reception threshold (e.g., a signal strength or power level (dBm)) such that the sensing platform may not have reception of any potential signal or associated wireless link below the reception threshold (e.g., a non-received platform-to-ground transmission 502), but may have reception of any potential signal or associated wireless link above the received threshold (e.g., the wireless link 110). However, the received wireless link 110 may also be received by parties other than the sensing platform 500, e.g., an adversary or hostile platform as indicated by the ARI 110a and the excess reception power indicator 504 (ERPI; e.g., detection power indicator). For example, the ARI 110a corresponding to the first successful reception via the wireless link 110 by an adversary may be seen at one or both ends of the wireless link, e.g., at the receiving end (e.g., at the sensing platform 500) and at the transmitting end (ARI 110a, FIG. 1).

Similarly, in embodiments the ERPI 504 may indicate how strongly the wireless signal (wireless link 110) is received by the adversary. For example, excess power may be defined as a power level above the minimum power threshold required to satisfy one or more applicable or selectable metrics defining wireless reception, including, but not limited to: absolute power, signal-to-noise-ratio (SNR); Eb/NO; jamming-to-signal ratio (J/S); signal-to-noise-and-distortion (SINAD) ratio. In some embodiments, the length of the line representing the wireless link 110 between the transmitting platform (102, FIG. 1) and the receiving platform (sensing platform 500) may represent or correspond to full signal power (e.g., the full effective isotropic radio power (Tx EIRP) from the transmitting platform). Further, the excess power percentage over the Tx EIRP may be indicated by an ERPI 504 shading (texturing, coloring, patterning) the corresponding percentage of the wireless link 110 starting from the receiving platform (sensing platform 500). In some embodiments, the graphic visualization 100 may include an excess reception energy indicator corresponding to energy levels instead of power levels.

In embodiments, with respect to both the received wireless link 110 and the non-received platform-to-ground transmission 502, line thickness (or any other appropriate graphic visualization scheme) may indicate signal strength (e.g., the non-received platform-to-ground transmission 502 may be below, but only slightly below, the detection threshold). For example, with respect to both wireless links (received link 110, non-received link 502), the power (dB) difference between the reception threshold and received signal strength (e.g., at the sensing platform 500) may be indicated in terms of path loss distance, ideal or otherwise. For example, with respect to the non-received platform-to-ground transmission 502, the signal visualization may shift formatting to indicate approximately a RTP (506) where the sensing platform 500 would need to be in order to have reception of the platform-to-ground transmission.

In embodiments, an RTP 506 may be determined by any appropriate application of one or more reception metrics as described above to set the RTP at a boundary between reception and non-reception. For example, referring back to FIG. 1, where non-reception of the wireless link 108 is due to jamming and/or co-site interference, the RTP 108c may reflect the effects of any changes in interfering power (e.g., jamming source).

Figure 6A:
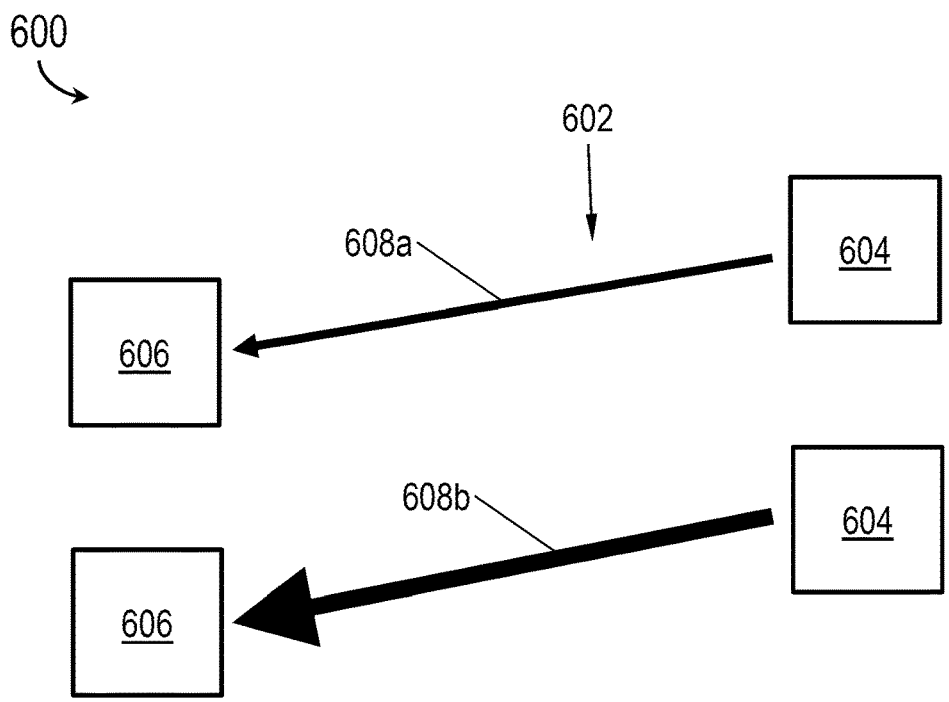
FIGS. 6A through 6C are example visualizations of the graphic visualization of FIGS. 1 through 5.

Referring now to FIG. 6A, the visualization elements 600 may be displayed as components of the graphic visualizations 100, 100a of FIGS. 1 through 5. In embodiments, the visualization elements 600 are intended as examples only; the graphic visualizations 100, 100a may convey link parameter data via any combination of graphical elements including, but not limited to, those indicated below.

In embodiments, the visualization elements 600 may graphically convey link parameter data to the operator by incorporating shapes, color, textures, line thicknesses, borders, and other like graphical elements (based on, e.g., the precise link performance parameters selected for graphical representation and/or simulated or real-world equipment limitations). For example, the visualization elements 600 may illustrate link parameter data corresponding to a wireless link 602 between two platforms, a transmitting platform 604 and a receiving platform 606. In some embodiments, a wireless link 608a represented by a relatively low-thickness line may convey a low-throughput transmission from the transmitting platform 604 to the receiving platform 606, while a wireless link 608b represented by a relatively high-thickness line may convey a high-throughput transmission. Lines may be straight, curvilinear, broken, or incorporate one or more of straight, curvilinear, and broken segments as needed or desired.

Figure 6B:
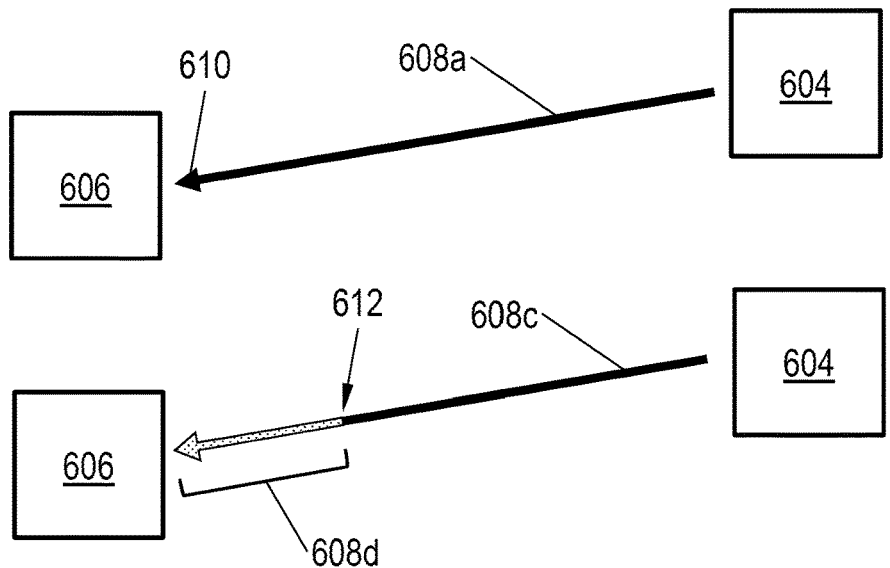

In embodiments, referring also to FIG. 6B, the wireless link 608a terminating (e.g., via the arrow 610 indicating the directionality of the wireless link) at or immediately adjacent to the receiving platform 606 may convey a successful transmission and/or a receiving platform within the transmission range of the transmitting platform 604. However, if the receiving platform 606 is out of range of the transmitting platform 604, the wireless link 608c may so indicate by terminating at an RTP 612 short of the receiving platform. For example, the distance 608d between the RTP 612 and the receiving platform may convey to the operator an actual predicted range shortfall of the wireless link, e.g., based on a required signal-to-noise (SNR) ratio at the receiving platform 606 (e.g., as required for an acceptable bit/error ratio (BER)).

Figure 6C:
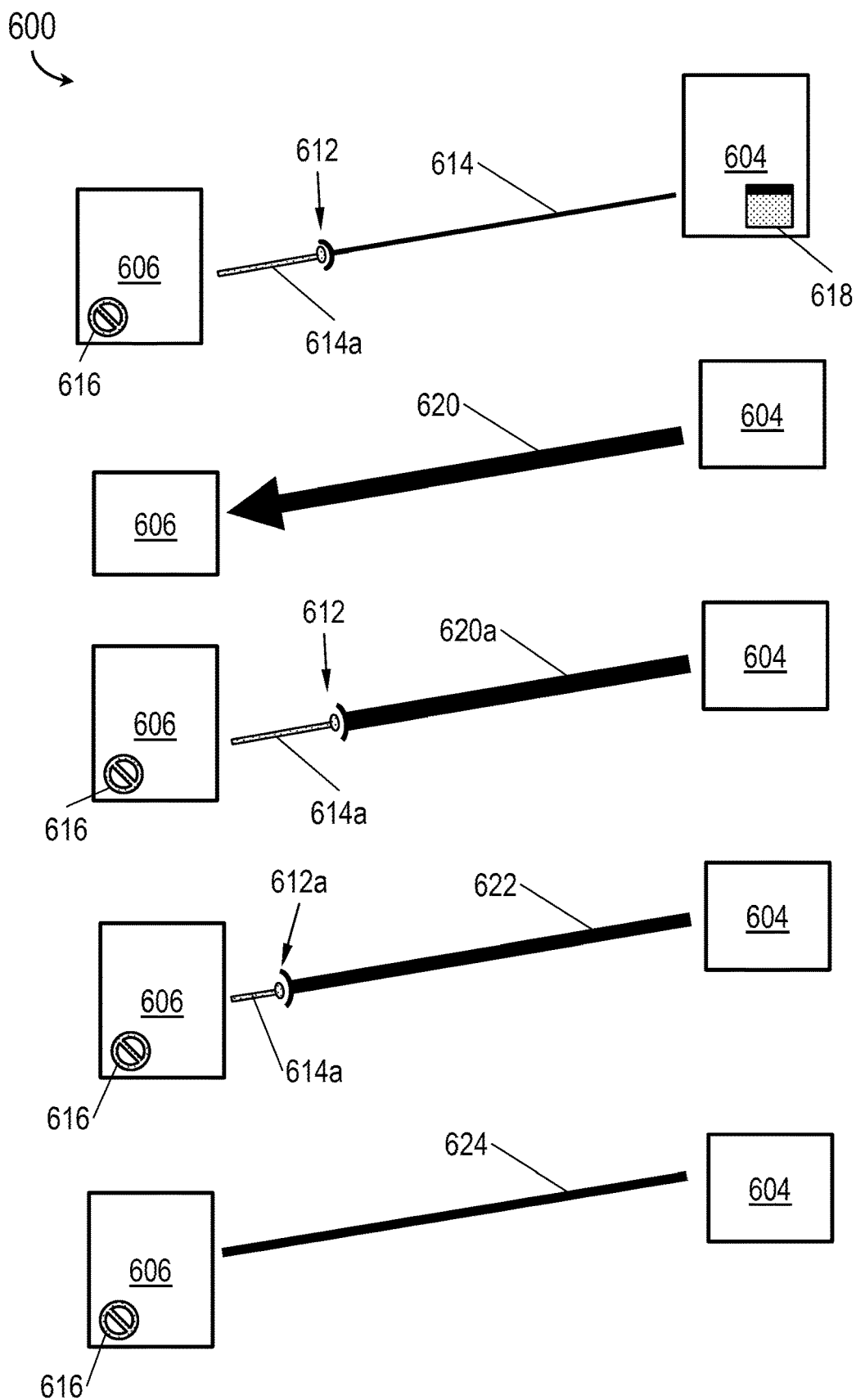

Referring also to FIG. 6C, in embodiments the visualization elements 600 may include a wireless link 614 in range of the receiving platform 606 but jammed (614a). For example, the wireless link 614 may indicate an RTP 612 based on, e.g., a distance from the transmitting platform 604 to a point (e.g., the RTP) where the wireless link 614 may not be overpowered by the jamming source, and where the receiving platform 606 may therefore have reception. The failure or non-reception of the wireless link 614 due to jamming (e.g., or terrain interference, BLOS, etc.) may be further indicated by, e.g., additional symbology (616) and/or appropriately shaded/textured link parameter reports (618).

In embodiments, the wireless link 620 may indicate a high data rate transmission to a receiving platform 606 within transmission range and unaffected by jamming. Similarly, the wireless link 620a may indicate a failure of the wireless link 620 due to jamming (614a) and similarly indicate the RTP 612) where the wireless link 620 would overpower the jamming source and the receiving platform 606 would have reception.

In embodiments, the wireless links 622, 624 may be implemented and may function similarly to the wireless links 620, 620a, except that the wireless links 622, 624 may represent incremental adjustments to the failing wireless link 620a at the transmitting platform 604 in order to successfully enable reception of transmissions at the receiving platform 606. For example, the wireless link 622 may represent a lower data rate and higher encoding relative to the wireless link 620a, attenuating but not eliminating the effect of the jamming 614a (as indicated by the shifted RTP 612a) such that the wireless link 622 still fails (per additional symbology 616). Similarly, the wireless link 624 may represent a further lowering of data rate and increased bit times (e.g., relative to the wireless link 624) such that the jamming 614a is almost, but not, overcome, and thus the wireless link 624 also fails (per additional symbology 616).

Referring generally to FIGS. 7A and 7B, the graphic visualization 700 may be implemented and may function similarly to the graphic visualizations 100, 100a of FIGS. 1 through 5, except that the system (200, FIG. 2) for multi-mode visualization may, in addition to visualizing in line connectivity (LC) mode via a variety of visualization elements (600, FIGS. 6A-C), visualize in additional presentation modes selectable by the operator.

In embodiments, referring to FIGS. 7A and 7B, the graphic visualization 700 may represent a platform-focused (PF) mode. For example, the operator may require a less cluttered presentation mode that draws on the same pool of received and/or calculated link performance parameter data as the LC mode; accordingly, the operator may select PF mode or other alternative presentation modes. PF mode may provide a higher-level or less cluttered graphic visualization 700 under some circumstances by representing wireless links with concentric elements rather than lines. Other presentation modes may emphasize or de-emphasize different link parameters than LC or PF modes in conveying link performance parameter data as needed or desired.

In embodiments, the graphic visualization 700 may incorporate concentric sets of bars or arcs to represent wireless links 702, 704, 706 originating or terminating at a platform 708. For example, depending on equipment limitations and/or user settings, the color or texture of wireless links 702-706 may indicate attempted vs. successful transmissions and receptions. In some embodiments, other colors may convey waveform or hostility information (e.g., friendly/hostile) specific to a wireless link 702-706. Data throughput or bandwidth, for example, may be conveyed by a line thickness of each bar or arc. The number of bars or arcs in a given set may convey, e.g., received signal-to-noise ratio (SNR) or signal-to-noise-and-jamming ratio (S/[N+J]) at the platform 708; received jamming-to-signal (J/S) ratio at the platform; and/or received signal power (transmitting/receiving power or jamming power) at the platform.

Figure 7C:
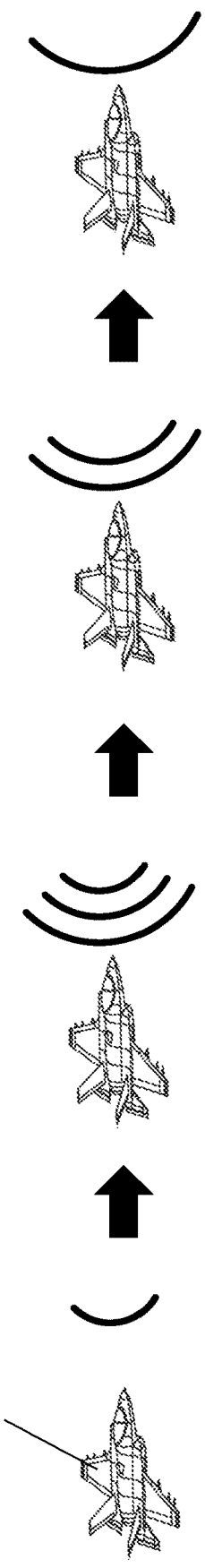

In embodiments, referring in particular to FIGS. 7B and 7C, the directionality of a transmission or reception may be conveyed by an orientation of the set of bars or arcs. For example, the bi-directional wireless link 702a-b may be implemented and may function similarly to the bi-directional wireless link 702 of FIG. 7A except that the bi-directional wireless link 702a-b may be represented by separate bar or arc sets for each direction (e.g., 702a indicating transmissions by the platform 708, 702b indicating receptions) indicating link parameters specific to that direction. A "movement" of bars or arcs (e.g., an animation of either bi-directional wireless link 702a-b) may convey successful/attempted transmissions by, or successful/attempted reception at, the platform 708.

In embodiments, referring back to FIG. 7A, the wireless link 702 may be associated with a high signal strength, high throughput/high bandwidth signal transmitted to a platform forward of the platform 708. For example, the wireless links 704, 706 may similarly represent transmissions from the platform 708, but in a different waveform than the wireless link 702 as indicated by a unique arc color (e.g., shade, pattern, texture) for each waveform; further, the wireless link 706 may be jammed (710) by a jamming source of greater bandwidth but at a lower jamming power level than the signal strength of the wireless link.

Figure 7D:
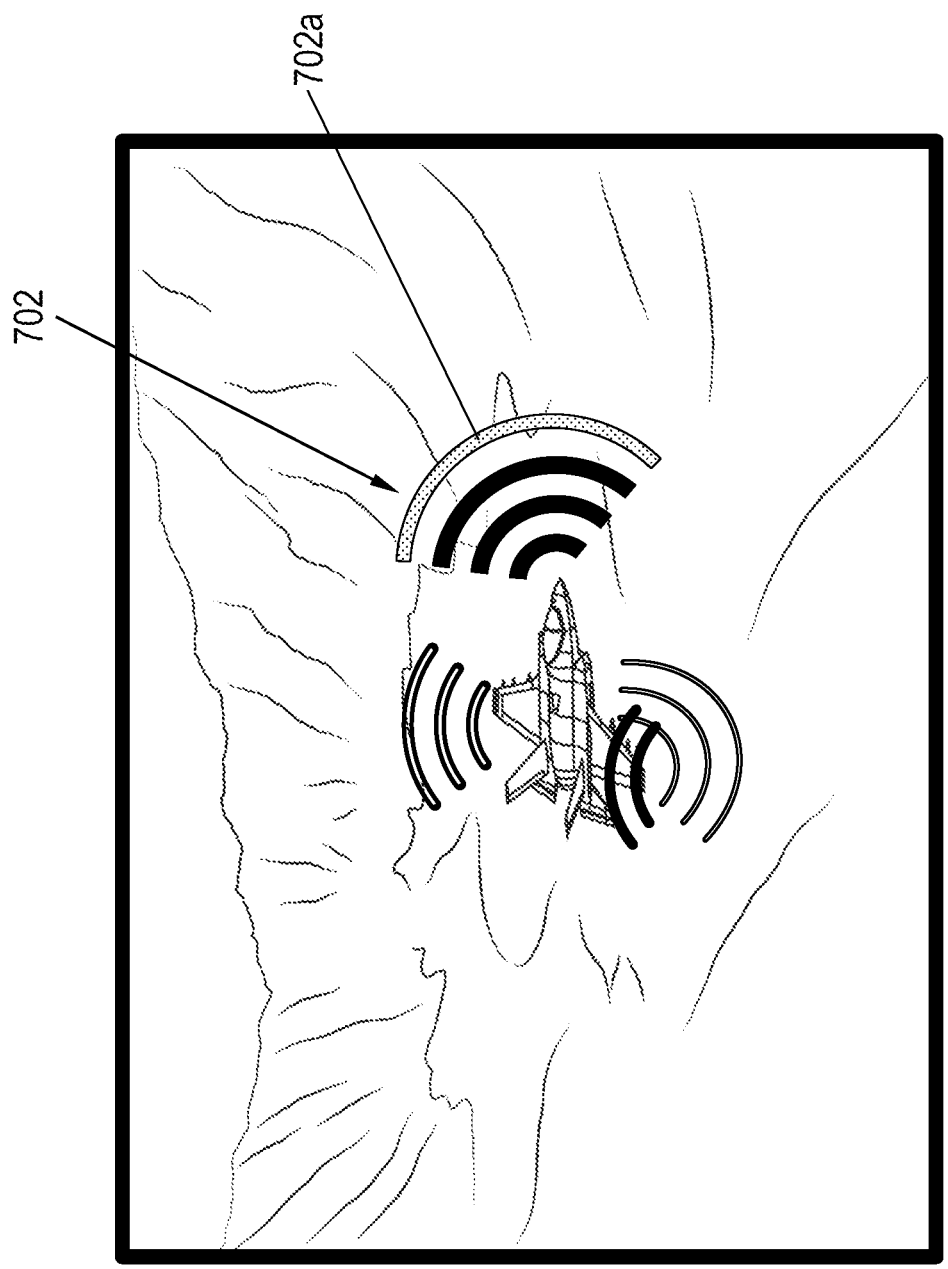

Referring also to FIG. 7D, in embodiments the wireless link 702 may further be received (e.g., detected or intercepted) by a hostile platform. For example, the reception of the wireless link 702 by an adversary may be indicated by an ARI 702a, e.g., coloring (or texturing, patterning, shading) the outermost bar of the wireless link in a different color or texture than the remaining bars or arcs (e.g., in red). It should be noted that, compared to LC mode (see, e.g., FIG. 1), PF mode may not indicate a direction or location of a detecting/intercepting platform, just that the wireless link 702 is being detected or intercepted.

Figure 8:
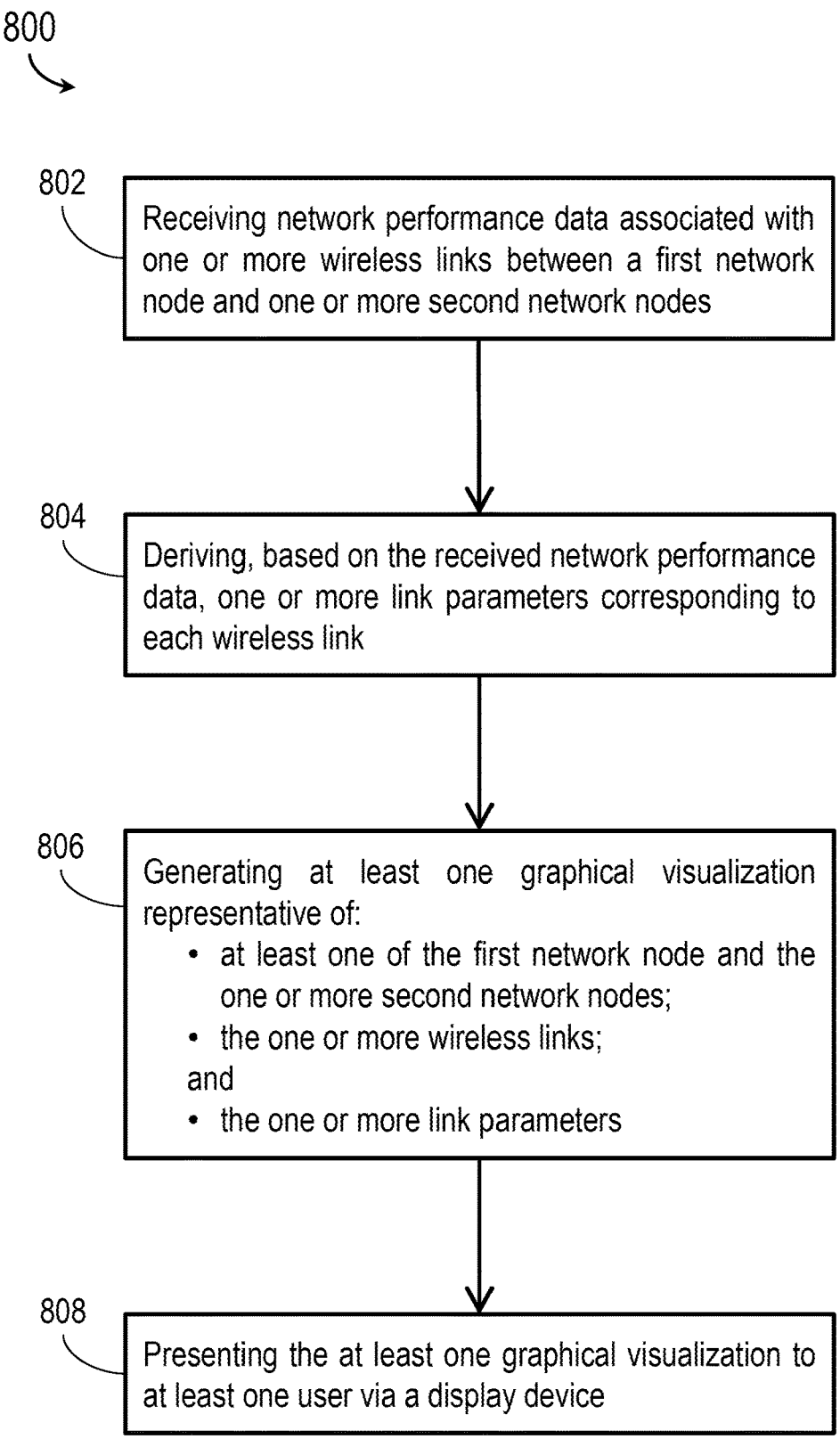
FIG. 8 is a flow diagram illustrating a method for multimode visualization of wireless link parameters according to example embodiments of this disclosure.

Referring now to FIG. 8, the method 800 may be implemented by the system 200 for multimode visualization and may include the following steps.

At a step 802, the system receives network performance data (e.g., link performance data) associated with one or more wireless links between a first platform or network node and one or more additional platforms or network nodes. For example, the network performance data may be sensed aboard a node or platform, received from another node or platform, or simulated according to a larger simulated environment.

At a step 804, the system derives link parameters for each wireless link based on the received network performance data. For example, the derived link parameters may include a bandwidth, waveform type, success/failure indicator of a transmitted or received packet, a jamming status, a low probability of intercept (LPI) signal detection status, or a negative link margin. In some embodiments, the wireless links include jammed links, and the link parameters may include a dB distance based on a signal-to-interference S/I ratio required (e.g., for acceptable BER) at the platform and the actual interference (e.g., jamming power) of the jamming source. In some embodiments, the jamming status may include a hostility status (e.g., whether the detecting/intercepting platform is hostile or friendly) of the jamming source. In some embodiments, the wireless links include detected or intercepted links, and the link parameters may include a hostility status or an Excess Reception Power Indicator (ERPI) based on excess SNR at the detecting/intercepting platform. In some embodiments, link parameters may include a data throughput status; a latency/delay status; and/or a hop count of the associated wireless link.

At a step 806, the system generates a graphical visualization of the platform or node (which may include multiple platforms and/or notes), the wireless links therebetween, and selected link parameters relevant to each wireless links. In some embodiments, the graphical visualization includes textual link parameter reports for each wireless communications link, including textual performance parameters for that link not otherwise graphically represented. In some embodiments, the graphical visualization includes a spectrum analysis report. For example, the textual link parameter reports and/or spectrum analysis report may be customizable based on control input submitted by a user.

At a step 808, the graphical visualization is presented to a user or operator via a display device. In some embodiments, the graphical visualization may incorporate multiple presentation modes for displaying selected link performance parameters, the displayed visualization selectable between two or more performance modes based on control input received by the user.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A system for multimode visualization of wireless link parameters, comprising:
   control processors associated with a first network node, the control processors configured to:
      receive network performance data associated with one or more wireless links between the first network node and one or more second network nodes; and
      derive from the received network performance data one or more link parameters corresponding to each of the one or more wireless links; and
   at least one graphics generator operatively coupled to the control processors, the at least one graphics generator configured to present, via at least one display device in communication therewith, at least one graphical visualization representative of:
      at least one network node including the first network node or the one or more second network nodes;
      the one or more wireless links, wherein the at least one graphical visualization representative of the one or more wireless links includes a line thickness graphical visualization, wherein a line thickness of the line thickness graphical visualization is configured to indicate signal strength between the first network node and the one or more second network nodes; and
      the one or more link parameters,
      wherein:
         (i) the one or more wireless links include at least one non-received link;
         (ii) the one or more link parameters include a non-reception status corresponding to the at least one non-received link;

(iii) the non-reception status includes a reception threshold position (RTP) based on at least one reception metric and an actual interference associated with the at least one non-received link;
(iv) the at least one non-received link includes at least one jammed link associated with one or more jamming platforms, wherein the at least one jammed link is represented by a first portion and a second portion, the first portion representing the at least one non-received link, the second portion representing jamming at a received jamming platform of the one or more jamming platforms, the first portion having a first graphic and the second portion having a second graphic, the first graphic being different from the second graphic; and
(v) the non-reception status includes at least one hostility status of the one or more jamming platforms, wherein the at least one hostility status indicates whether the one or more jamming platforms are hostile or friendly.

2. The system of claim 1, wherein:
the one or more wireless links include at least one received link associated with a reception platform;
the one or more link parameters including at least one LPI reception status associated with the at least one received link associated with the reception platform, wherein the LPI reception status is at least one of:
a hostility status of the reception platform; or
an excess reception power indicator (ERPI) based on a power level of the received link above a reception threshold.

3. The system of claim 1, wherein the at least one graphical visualization includes a spectrum analysis display representative of the first network node, the spectrum analysis display including at least one of:
one or more frequency bandwidths associated with the one or more wireless links; or
one or more signal power levels associated with the one or more wireless links, wherein the one or more signal power levels include at least one of a peak power or an average power.

4. The system of claim 1, wherein the at least one graphical visualization includes:
at least one interactive text display corresponding to each of the one or more wireless links, the at least one interactive text display configured for presenting a customizable textual display of the one or more link parameters corresponding to the each of the one or more wireless links.

5. The system of claim 1, wherein the at least one graphics generator is configured to present a first graphical visualization associated with a first presentation mode and at least one second graphical visualization associated with a second presentation mode, the system further comprising:
an input means for accepting control input from a user, the input means configured to toggle the at least one display device between the first graphical visualization and the at least one second graphical visualization based on the accepted control input.

6. The system of claim 1, wherein the one or more link parameters include at least one of:
1) a bandwidth;
2) a waveform type;
3) a reception status including complete reception status, a partial reception status, or a non-reception status;
4) a jamming status;
5) a low probability of intercept (LPI) detection status; or
6) a link margin.

7. A method for multimode visualization of wireless link parameters, the method comprising:
receiving network performance data associated with a plurality of wireless links between a first network node and one or more second network nodes;
deriving, based on the received network performance data, one or more link parameters corresponding to each wireless link of the plurality of wireless links;
generating at least one graphical visualization representative of:
at least one of the first network node and the one or more second network nodes;
the plurality of wireless links, wherein the at least one graphical visualization representative of the plurality of wireless links includes a line thickness graphical visualization, wherein a line thickness of the line thickness graphical visualization is configured to indicate signal strength between the first network node and the one or more second network nodes; and
the one or more link parameters;
and
presenting the at least one graphical visualization to at least one user via a display device,
wherein:
(i) the plurality of wireless links include at least one non-received link;
(ii) the one or more link parameters include a non-reception status corresponding to the at least one non-received link;
(iii) the non-reception status includes a reception threshold position (RTP) based on at least one reception metric and an actual interference associated with the at least one non-received link;
(iv) the at least one non-received link includes at least one jammed link associated with one or more jamming platforms, wherein the at least one lammed link is represented by a first portion and a second portion, the first portion representing the at least one non-received link, the second portion representing jamming at a received jamming platform of the one or more jamming platforms, the first portion having a first graphic and the second portion having a second graphic, the first graphic being different from the second graphic; and
(v) the non-reception status includes at least one hostility status of the one or more jamming platforms, wherein the at least one hostility status indicates whether the one or more jamming platforms are hostile or friendly.

8. The method of claim 7, wherein deriving, based on the received network performance data, one or more link parameters corresponding to each wireless link of the plurality of wireless links includes deriving at least one of:
1) a bandwidth;
2) a waveform type;
3) a reception status including a complete reception status, a partial reception status, or a non-reception status;
4) a jamming status;
5) a low probability of intercept (LPI) reception status; or
6) a link margin.

9. The method of claim 7, wherein:
the plurality of wireless links include at least one received link associated with a receiving platform;

deriving, based on the received network performance data, one or more link parameters corresponding to each wireless link of the plurality of wireless links includes:
deriving at least one LPI reception status including:
an excess reception power indicator (ERPI) based on a power level of the at least one received link above a reception threshold.

10. The method of claim 7, wherein generating at least one graphical visualization representative of the first network node, the plurality of wireless links, and the one or more link parameters includes:
generating a spectrum analysis display representative of the first network node and the plurality of wireless links.

11. The method of claim 7, wherein generating at least one graphical visualization representative of the first network node, the plurality of wireless links, and the one or more link parameters includes:
generating at least one interactive text display corresponding to each wireless link of the plurality of wireless links, the at least one interactive text display configured for presenting a customizable textual display of the one or more link parameters corresponding to the each wireless link of the plurality of wireless links.

12. The method of claim 7, wherein presenting the at least one graphical visualization to at least one user via a display device includes presenting at least one first graphical visualization associated with a first presentation mode and at least one second graphical visualization associated with a second presentation mode, further comprising:
accepting a control input from the at least one user; and
based on the accepted control input, transitioning the display device between the at least one first graphical visualization and the at least one second graphical visualization.

* * * * *